United States Patent [19]
Fuentes

[11] Patent Number: 6,044,754
[45] Date of Patent: Apr. 4, 2000

[54] COFFEE MAKER FILTER HOLDER SYSTEM

[75] Inventor: Francisco Causo Fuentes, Eibar, Spain

[73] Assignee: Oficina de Investigacion Agrupada, S.A., Eibar, Spain

[21] Appl. No.: 09/238,217

[22] Filed: Jan. 27, 1999

[30] Foreign Application Priority Data

Jan. 27, 1998 [ES] Spain ..................................... 9800142

[51] Int. Cl.⁷ .................................................. A47J 31/14
[52] U.S. Cl. ........................... 99/295; 99/302 R; 99/319; 99/323
[58] Field of Search ............................. 99/295, 323, 318, 99/319, 302 R, 299

[56] References Cited

U.S. PATENT DOCUMENTS

| | | | |
|---|---|---|---|
| 4,255,265 | 3/1981 | Greutert | 99/319 X |
| 4,497,243 | 2/1985 | Cavalli | 99/323 |
| 4,644,856 | 2/1987 | Borgmann | 99/295 |

Primary Examiner—Reginald L. Alexander
Attorney, Agent, or Firm—Helfgott & Karas, P.C.

[57] ABSTRACT

The filter holder (9) is fitted on its inner wall with a plurality of equiangularly arranged radial bolts (12), preferably three, whereas the fixed support (2) is in turn fitted with respective spiral slots (13) in which the bolts (12) play, wherein when the filter holder is turned, driven manually through the handle (10), the filter holder travels axially at the same time; specifically, the filter (7), along with its respective coffee measure (8), moves towards the hot water supply extension (1) just before infusion takes place, or away in order for the coffee measure (8) to be replaced. These combined angular-axial filter holder (9) travelling elements enable the filter (7) to be perfectly coupled to the water outlet extension (1) without any unwanted side leakage.

6 Claims, 2 Drawing Sheets

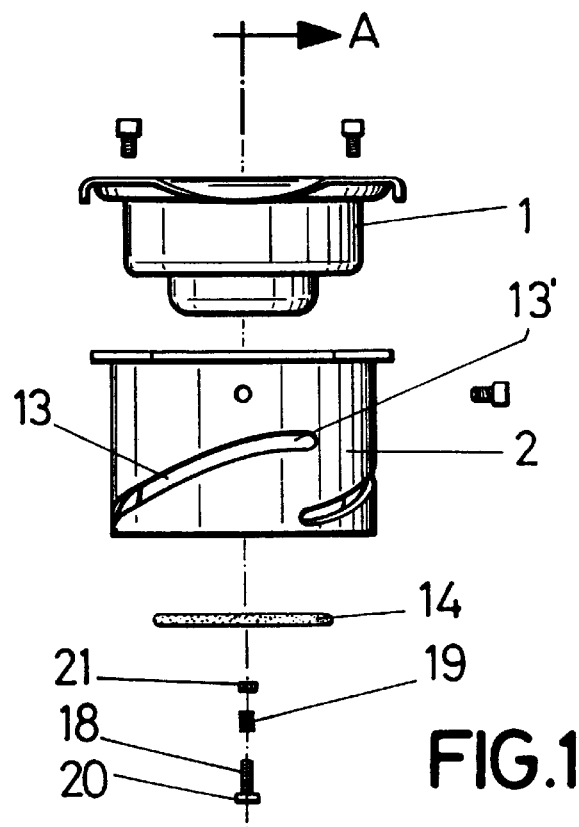
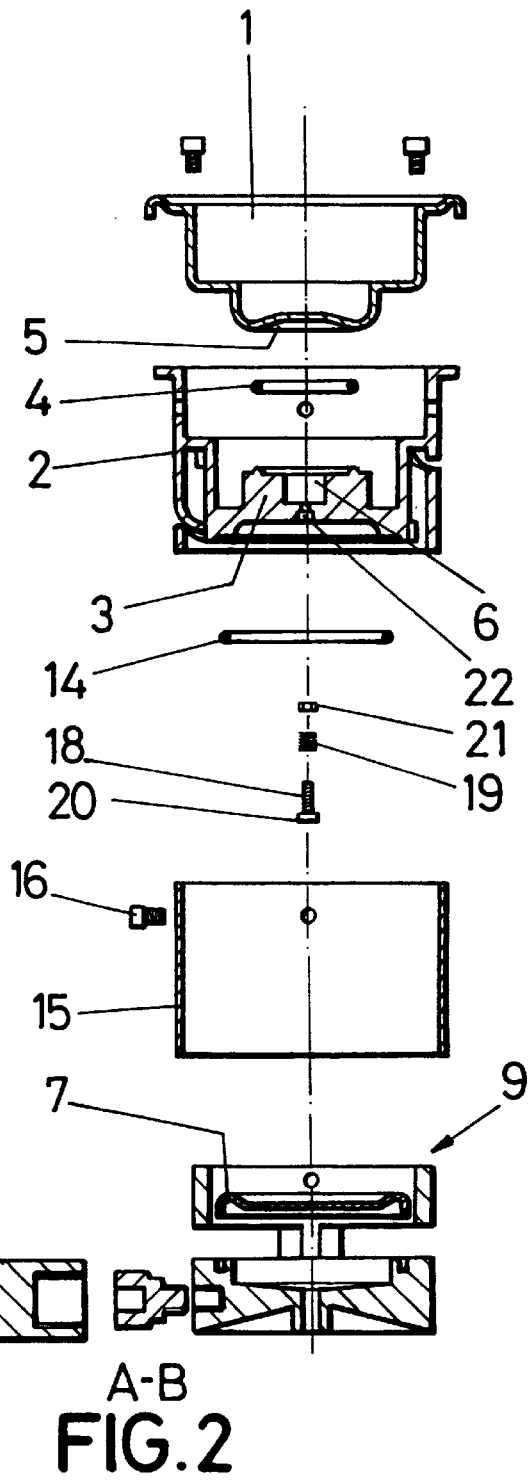
FIG.1
FIG.2

COFFEE MAKER FILTER HOLDER SYSTEM

OBJECT OF THE INVENTION

The present invention relates to a new coffee maker filter holder system, applicable to so-called "espresso" coffee makers that work with a single measure of coffee, specifically coffee makers in which said coffee measure is housed within a filter paper wrap and is designed to be arranged on a filter holder in order for the necessary quantity of water required for the infusion to be obtained to pass therethrough.

The object of the invention is to provide a filter holder system comprising a small number of parts that are easy to assemble and take apart, which moreover allows the filter holder to be sealed to the reservoir during the infusion step, in order for the full measure of hot water to pass through the coffee.

BACKGROUND OF THE INVENTION

Coffee makers of this kind generally comprise a water supplying reservoir, fitted with heating means for the appropriate temperature level to be attained, the bottom of such reservoir being provided with an extension allowing hot water out towards the filter paper wrap containing the coffee measure.

This measure of coffee, with its filter paper wrap, is arranged on a filter holder that must be capable of travelling vertically, in order to receive the coffee measure in its lowermost position, whereas in its uppermost position this assembly is coupled to the reservoir water outlet extension, just before the coffee infusion is distributed.

The filter holder in such coffee makers is thus generally mounted on a fixed support to the bottom of the reservoir, fitted with means that enable the filter holder to travel vertically relative to the hot water outlet extension, which travel takes place by actuating an outer grip or handle which, upon turning, drives a cam that causes the filter holder to rise, until it adapts to the hot water outlet extension, whereas when actuated in the opposite direction, return springs cause the filter holder to move down to the lowermost position for the used coffee measure to be removed and replaced with a new one. The fixed support is fitted with vertical slides guiding the filter holder as it travels up and down.

As we have seen, this solution requires a large number of parts to operate and is therefore complicated to assemble, take apart or repair, and indeed also poses a sealing problem relative to said reservoir water outlet extension. These sealing problems lie in the very means that raise and lower the filter holder, specifically in the use of cams, slides and springs that cannot ensure a perfectly horizontal travel of the filter holder and therefore a perfect seal between the same and the reservoir water outlet extension.

DESCRIPTION OF THE INVENTION

The filter holder system subject of the invention fully solves the problems described above in that it allows the filter holder to be sealed to the lower reservoir water outlet extension, whereby it is absolutely impossible for perimetral spillage to occur beyond the coffee measure, detrimental to the infusion quality. This is all achieved using a limited number of parts, which means that assembling, taking apart and maintaining the system is quite simple.

More specifically, the system disclosed herein is based upon the provision on the inner filter holder surface of several bolts designed to play within respective slots of the fixed support, which slots are spiral in shape and therefore when the filter holder bolts reach the lowermost position within said slots, the filter holder also takes up a lowermost position in which the coffee measure may be easily replaced, whereas when the filter holder turns, manually driven through a classic handle, its bolts rise along the ramps defined by the fixed support slots, up to an uppermost position in which the circumference of the filter adapts perfectly to the mouth of the water-supplying reservoir, preferably with a gasket in between, which ensures a perfect sealing in order to avoid unwanted liquid leakage.

In accordance with another characteristic of the invention, said spiral fixed support slots are designed to have a direction change close to their top end, defining an almost horizontal terminal sector which avoids the tendency of the filter holder to disengage itself in such a limiting position.

Said filter holder bolts may lean directly on the spiral fixed support slots or do so through bushes or sheaves enhancing the rolling conditions.

In practice, the filter may be directly adapted to the water outlet mouth, as described above, or be so adapted with a middle ring in between, duly established on the fixed support, said ring being sealed to said reservoir mouth with a gasket in between, whereas the circumference of the filter holding the coffee measure is coupled to said ring with the assistance of another gasket.

The filter holder of the invention has a large side window for the measure to be inserted and removed and a number of elongate windows enabling any type of measure to be used, indeed those in which the filter paper is square in shape, for in that case the corners of the filter paper shall project from the filter holder through said windows.

A housing is in any event designed to be arranged around the slide part, screwed or otherwise conventionally fixed to the latter and acting as a guard and ornamental cap therefor.

The provision of a measure-removing device has also been provided in order to avoid that when the coffee infusion is ready and the filter holder is taken to the lowermost or removal position, the measure may stick to the middle ring on the fixed support, making it difficult to remove.

The removing device consists of a finger or thruster, provided with an enlarged end or head, and a spring acting on said head, which assembly is fitted in a central bore provided in the middle fixed support ring in such a way that, by spring action, the head of the removing finger will act on the coffee measure, pushing it down and preventing it from sticking to the middle ring. Obviously, upon acting on the filter holder to take it to the top position, the measure itself pushes the ejecting finger against the spring action, causing the same to retract.

DESCRIPTION OF THE DRAWINGS

In order to provide a fuller description and contribute to the complete understanding of the characteristics of this invention, in accordance with a preferred practical embodiment thereof, a set of drawings is attached to the specification as an integral part thereof which, while purely illustrative and not fully comprehensive, shows the following:

FIG. 1. Is an exploded side elevation view of a coffee maker provided with the filter holder system subject of the present invention.

FIG. 2. Is a close sectional view of the assembly represented in the preceding figure, along line A-B of said figure.

PREFERRED EMBODIMENT OF THE INVENTION

Figure 3:
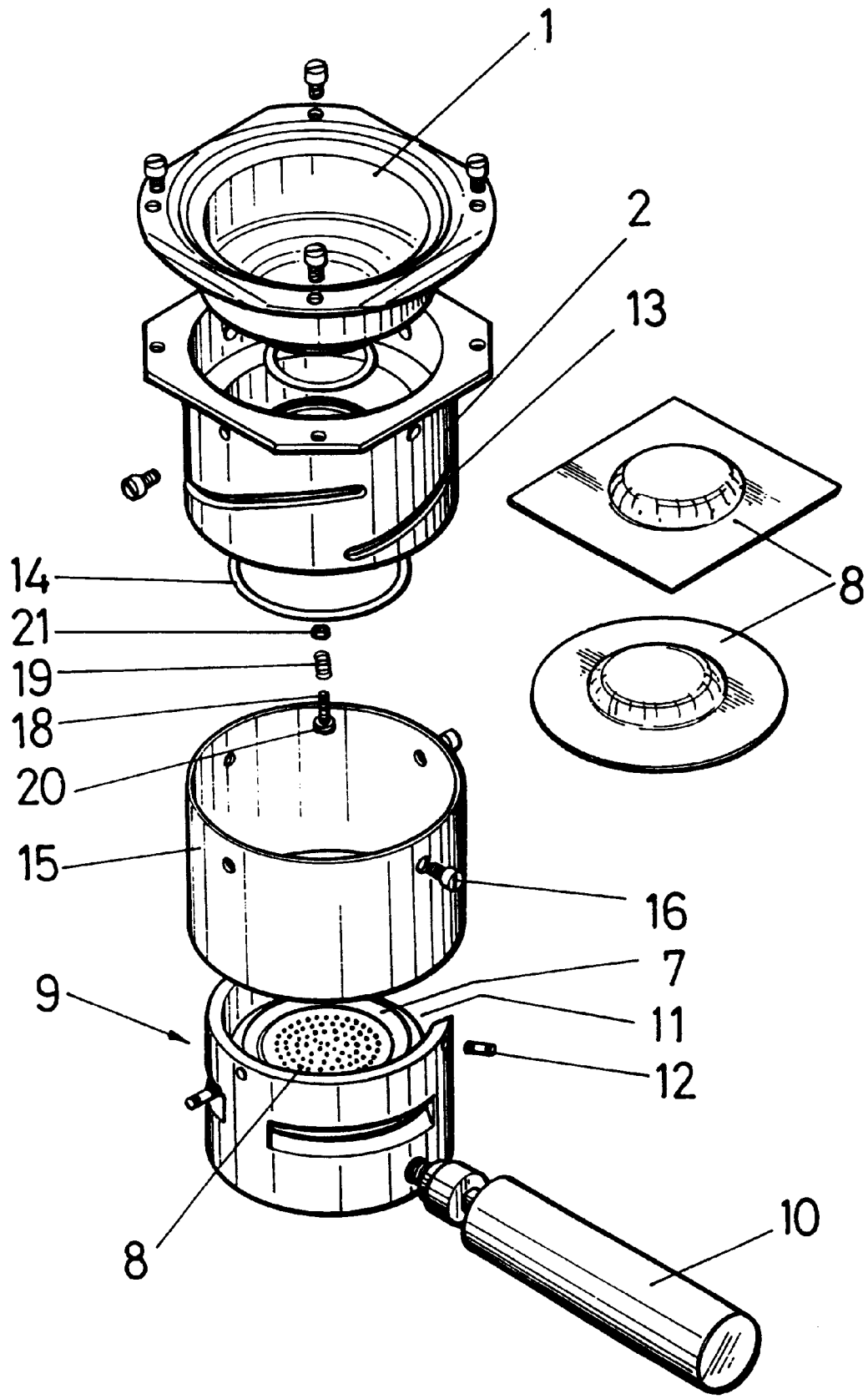
FIG. 3. Is, finally, an exploded perspective view of the assembly represented in the preceding figures.

With reference to these figures, the system disclosed herein can be seen to apply to coffee makers in which a hot water reservoir, which is not shown, ends in a bottom extension (1), to which extension or the reservoir proper a fixed support (2) may be coupled, which in the practical embodiment represented in the figures has an inner ring (3) which, with the assistance of a gasket (4), allows said extension (1) to be sealed to the outlet (5), thereby for water to pass through the axial bore (6) of the ring (3) and reach the filter (7) holding the coffee measure (8), duly established within a filter holder (9), provided with a manual drive handle (10) and a large side window (11) for inserting and removing the coffee measure (8) from within the same.

Now then, based upon this basic conventional construction, the system disclosed herein is primarily characterised in that the filter holder (9) is internally fitted with a plurality of equiangularly arranged radial bolts (12), preferably three, playing directly or fitted with sheaves or friction bushes within respective spiral slots (13) operatively made on the wall of the fixed support (2), wherein when the filter holder (9) is made to turn, by moving the handle (10) sideways, upon the bolts (12) moving along the slots (13), the filter holder travels axially and consequently moves towards or away from the filter (7) relative to the ring (3) on the fixed support (2), a gasket (14) being established between said elements to ensure that they are sealed.

In accordance with the above description and starting at a limiting position in which the bolts (12) lie at the lower end of the slots (13) and in which the window (11) is directly accessible, a coffee measure (8) may be inserted within the filter holder (9), obviously after removing the used measure, and by turning the handle (10) sideways the filter holder (9) gradually moves up to a limiting position in which the filter (7) adapts to the ring (3) on the fixed support (2) with said gasket (14) in between.

In order for this uppermost position to be stable, with reference particularly to FIG. 1, the slots (13) have been provided with a far less inclined near-horizontal terminal sector (13') where the "ramp" effect urging the filter holder to turn itself in the opposite direction disappears.

Furthermore, and with reference to the figures, the filter holder includes a number of elongate windows (17) which enable any type of measure to be used, indeed those in which the filter paper is square in shape, for in such case the corners of the filter paper will project through said windows (17).

In addition, the middle ring can include a device for removing the measure which, in the embodiment shown in the figures, consists of a finger or thruster (18) provided with an enlargement or head (20) actuated by a spring (19) permanently biasing the finger (18) down, in such a way that its head (20) constantly pushes the coffee measure down, thereby preventing it from sticking to the middle ring (3) on the fixed support (2).

The finger or thruster (18) is fitted in a central bore (22) of the middle ring (3) by means of a nut (21) and may travel vertically relative to the ring in such a way that the spring (19) action causes the head (20) of the finger (18) to lie at a position below the lower edge of the ring, thereby pushing the measure down, whereas upon the filter holder being actuated to drive it up to the upper position, the measure itself causes the finger (18) to retract, to be housed within the middle ring (3).

It need finally only be added that the fixed support (2) is guarded and ornamentally capped by an enveloping housing (15) which is screwed (16) or otherwise conventionally fixed to the actual support (2), concealing it.

I claim:

1. A coffee maker filter holder system, particularly for "espresso" type coffee makers working with a coffee measure duly housed within a filter paper wrap, standing as a replaceable unit within a filter holder capable of travelling vertically within a fixed support, directly or indirectly attached to a hot water-supplying reservoir, which is provided with an extension flowing into the filter, characterised in that said filter holder (9) is fitted on its inner surface with a plurality of equiangularly arranged bolts (12), preferably three, with associated respective spiral slots (13) operatively established on the wall of the fixed support (2), wherein a manual turning movement supplied to the filter holder (9) through the respective handle (10) causes the same to travel axially towards or away from the hot water outlet extension (1).

2. A coffee maker filter holder system, as in claim 1, characterised in that the spiral slots (13) of the fixed support (2) have a far less inclined near-horizontal top end sector (13') to establish a stable position of the filter holder in its uppermost position, wherein the filter (7), with the assistance of a sealing gasket (14), is sealed to the inner ring (3), acting as connecting means to the outlet (5) from the lower reservoir extension (1).

3. A coffee maker filter holder system, as in claim 1, characterised in that the filter holder (9) has a large side window (11) for the measure (8) to be inserted and removed and a number of elongate windows (17) which allow any type of measure to be used.

4. A coffee maker filter holder system, as in claim 1, characterised in that the bolts (12) are capable of acting directly on the slots (13) or may be provided with bushes or sheaves enhancing their sliding.

5. A coffee maker filter holder system, as in claim 1, characterised in that the fixed support includes a device for removing the measure, consisting of a finger or thruster (18) fitted with an enlarged end or head (20), actuated by a spring (19), which device is mounted to travel vertically in a central bore (22) of the middle ring (3), thereby for the end or head (20) to act on the measure due to the spring bias, pushing it down and preventing it from sticking to the middle ring (3).

6. A coffee maker filter holder system, as in claim 1, characterised in that an enveloping housing (15) is screwed (16) or otherwise fixed as a guard and ornamental cap to the fixed support (2), concealing the same.

* * * * *